2,780,880
SIGN HOLDER FOR AUTOMOBILES

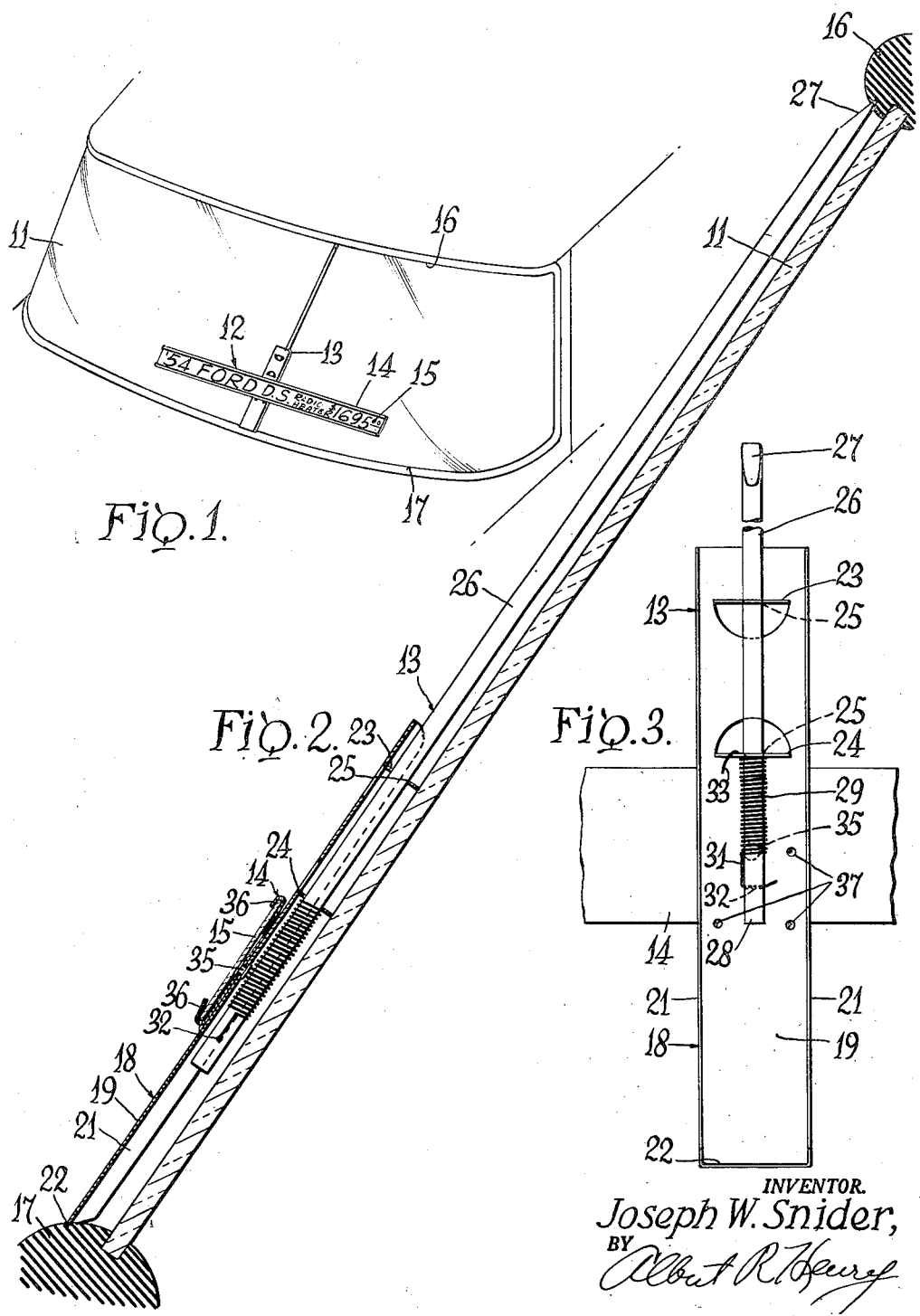

Joseph W. Snider, Eggertsville, N. Y.

Application November 25, 1955, Serial No. 549,025

4 Claims. (Cl. 40—129)

This invention relates to a sign holder particularly adapted to be detachably positioned on the windshield of an automobile, for the reception of indicia indicating the price, make, and like data for the ready information of a prospective purchaser.

Dealers in automobiles, for example, dealers in used cars, frequently print on the windshield or a door window the price and year model of the car, so that a person seeking a car can tell at a glance some of the information which he will want in order to arrive at a decision respecting it. If he asks for a demonstration, the dealer must take time to scrub off the data, and it sometimes happens that the information conveyed thereby is forgotten before the car is returned to the show room or outdoor lot. Another practice has been to hang a cardboard price tag on the windshield wiper or door handle, and these are apt to be dislodged by wind or rain.

According to the present invention, there is provided a sign holder which may be firmly secured on the wind shield between the upper and lower molding strips therefor, and which includes a readily adjustable supporting structure and a transversely disposable channel-shaped member, in which may be removably positioned a display sign having thereon appropriate inscriptions relating to the automobile.

A practical embodiment of the invention is illustrated in the accompanying drawing, wherein:

Fig. 1 is a fragmentary perspective of an automobile, having the sign holder positioned thereon;

Fig. 2 is an enlarged longitudinal section through the sign holder; and

Fig. 3 is a fragmentary rear elevation of the holder.

As shown in Fig. 1, there is positioned on the windshield 11 of a passenger automobile a sign, generally designated by the number 12, and which includes a member 13 positioned in an upright direction, a member 14 disposed transversely thereof, and an indicia card or cards 15 carried by the member 14. The member 13 rests at its ends against the upper and lower molding strips or bezels 16 and 17, by means of which the windshield is secured to the car body. As is further shown in Figs. 2 and 3, the member generally designated by the numeral 13 comprises a supporting length 18 of channel-shaped light metal, such as aluminum, having a web 19 and side flanges 21. The bottom edge 22 of the channel is beveled, to provide a relatively sharp edge which can bite lightly into the molding strip 17.

The upper portion of the support 18 is formed with two inwardly struck lugs 23 and 24, which may be made by slitting the metal along a semicircular line and bending the slit portions inwardly to lie parallel to each other and perpendicular to the web 19. Each of these lugs is pierced with a circular hole 25, which holes are in alignment with each other. A rod or stick 26 extends through these holes, and its outer end 27 is beveled, to bite into the upper molding strip 16, thus securing the holder to the windshield. The lower end 28 of the stick 26 extends below the lug 24, and it is there surrounded by a coiled tension spring 29 which has its lower end 31 engaged and secured in an aperture 32 in the stick. The upper end 33 of the spring passes through a small aperture drilled in the lug 24, to be retained therein, and the upper turn of the spring abuts the surface of the lug 24.

It will be apparent that the stick 26, guided in the apertures 25 in the lugs 23 and 24, may have limited longitudinal movement with respect to the support 18, and that the spring 29 biases the stick to its most extended position. In positioning the device on a windshield, it is therefore only necessary to push the stick downwardly toward the bottom edge 22 of the channel 18, until the upper end 27 is in a position to engage the molding 16. The parts are of such length, of course, as to enable the holder to be adapted for engagement with windshields of various heights and styles, so that the holder may be adjustably and detachably secured to a wide variety of models.

The member 14 comprises a suitable length of a channel of light sheet metal, pivotally connected to the channel 18 at its midportion by a rivet 35, and facing outwardly from the channel flanges 21. The flanges 36 of the member 14 may be bent over, to provide a retaining guideway for the cards 15 which are positioned therebetween. One or both of the channels 14 and 18 may be formed with protuberances or dimples 37, so that, when the card retaining channel 14 is disposed transversely, the dimples provide holding stops to preclude the accidental arcuate displacement of the channel 14. When the sign holder is not in use, the channel 14 may be rotated to be parallel to the channel 18, thus reducing the bulk of the holder, and permitting it to be stored in a small space.

It will be apparent that the invention provides a simple and inexpensive sign holder particularly adapted for the display, in a dignified manner, of sales information useful in the merchandising of automobiles. It may be readily attached to or detached from the car, and the indicia displayed thereon may be readily changed to suit the needs of the occasion. While the invention has been described with respect to only one embodiment, it is to be understood that it should be deemed to encompass all those variations and adaptations which are encompassed within the scope of the following claims.

I claim:

1. A sign holder comprising a support member formed with guide apertures, a stick slidably mounted in said apertures, a spring having one end connected to one end of the stick and the other end connected to the support member to yieldingly bias the stick to an extended position with respect to the support member, the opposite end of the stick and the end of the support member remote therefrom being beveled to enable said support member and stick to be detachably engaged on a frame to which the holder may be applied, and an indicia retaining member connected to the support member and adapted to be positioned transversely thereof.

2. A sign holder adapted to be positioned on the windshield of an automobile and between portions of a molding delimiting the windshield, comprising a support having spaced lugs thereon, said lugs being formed with aligned apertures, a stick slidably mounted in said apertures, said stick at one end extending beyond one end of the support, the opposite end of the stick extending below the lug remote from said one end, a coiled spring surrounding the stick at said opposite end below said lug, one end of the spring being connected to the stick adjacent said opposite end and the other end of the spring being connected to the support to yieldingly bias the stick toward said lug, and an indicia retaining member pivotally mounted on said support and movable from a position parallel thereto to a position transverse thereof.

3. A sign holder as set forth in claim 2, wherein protuberances are provided between the support and indicia retaining member to retain the said member from accidental displacement when it is in its transverse position.

4. A sign holder comprising a channel shaped support, spaced upper and lower lugs struck inwardly from the web thereof and disposed substantially perpendicular thereto between the flanges of the support, said lugs being formed with apertures in alignment with each other, a stick slidably mounted in said apertures and having one end extending beyond an end of the support, said one end being beveled, the edge of the support opposite said one end of the stick also being beveled along its flanges thereby to provide a relatively sharp edge, said sharp edge and beveled edge being adapted to engage portions of a frame to retain the support and stick in position, the opposite end of the stick projecting below the lower lug, a coiled tension spring surrounding the stick below the lower lug and having one end engaged in said lower lug and the other end engaged in the adjacent end of the stick, a card retaining member pivotally mounted on the web of the support and facing outwardly from the flanges thereof, said card retaining member being in the form of a channel with its flanges bent inwardly to provide a guideway for cards bearing indicia, and protuberances projecting from the web of the support to engage the card retaining member and retain it from accidental displacement when said card retaining member is disposed transversely of the support.

No references cited.